T. A. EDISON.
Telephone or Speaking-Telegraph.
No. 203,018.      Patented April 30, 1878.
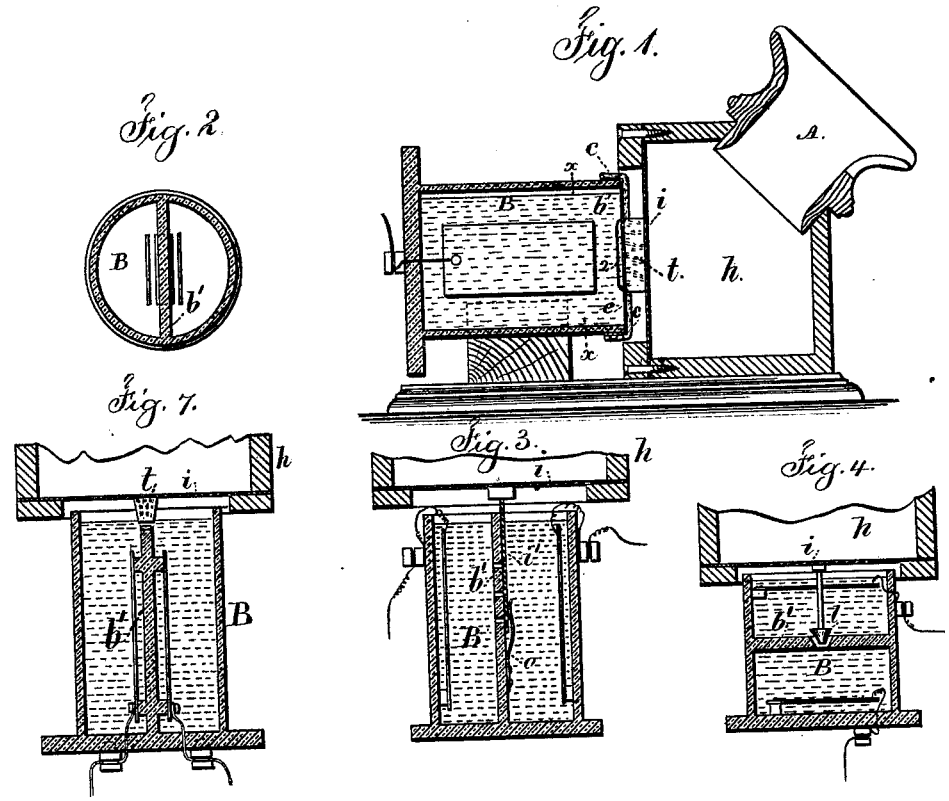
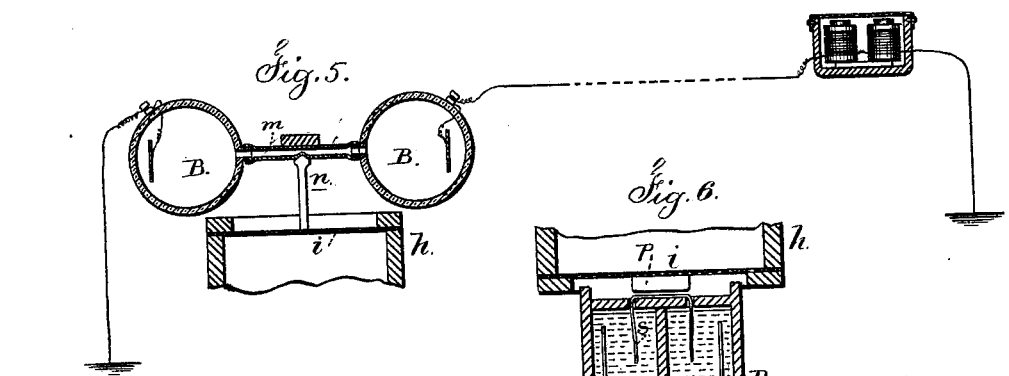
Witnesses
Chas. H. Smith
Geo. T. Pinckney
Inventor
Thomas A. Edison
per Lemuel W. Serrell
atty

UNITED STATES PATENT OFFICE.

THOMAS A. EDISON, OF MENLO PARK, NEW JERSEY, ASSIGNOR TO WESTERN UNION TELEGRAPH COMPANY, OF NEW YORK, N. Y.

IMPROVEMENT IN TELEPHONES OR SPEAKING-TELEGRAPHS.

Specification forming part of Letters Patent No. 203,018, dated April 30, 1878; application filed December 13, 1877.

*To all whom it may concern:*

Be it known that I, THOMAS A. EDISON, of Menlo Park, in the State of New Jersey, have invented an Improvement in Speaking-Telegraphs, of which the following is a specification:

I make use of two or more cells containing a mobile fluid, and these fluids are insulated from each other except when they come together at a narrow opening or space, and there is an electrode in each cell, and the diaphragm or other body vibrated by the atmospheric sound-waves regulates the opening or the pressure at this point, so as to vary the electric tension on the line to correspond with the sound vibrations.

In the drawing, Figure 1 is a vertical longitudinal section of an acoustic transmitter fitted with my improvement, and Fig. 2 is a cross-section at the line $x\ x$.

B is a cylinder of insulating material, divided by a partition, $b'$, into two compartments or cells filled with a conducting-fluid. In each cell is an electrode of platina, carbon, or other conductors, one of which is connected to the line-wire, and the other to the battery and earth. The top portion of the partition $b'$ is slightly hollow, leaving a passage-way, 2, for the fluid and current to circulate from one cell to the other.

Resting upon the face of the cylinder is a flexible head of mica, rubber, or other non-conducting material, $e$, impervious to the fluid, and over this is secured a cap, $c$, provided with a slot. When the cap $c$ is securely fastened to the cylinder, the diaphragm prevents any of the fluid from circulating from one cell to the other except through the small aperture at 2, made by the curve on the end of the partition $b'$. $h$ is a box with a mouth-piece, A, and at one side of the box is secured the diaphragm $i$, and upon the diaphragm is a piece of cork, $t$, which extends outward from it, and through the slot in the cap $c$, on the head of the cylinder B, and comes in contact with the mica or rubber flexible head $e$, to which it may be secured by a cement, although this is not actually necessary.

The operation is as follows: When the diaphram $i$ is properly adjusted to the diaphragm in the cylinder B, the space for the circulation of the fluid from one cell to the other is very narrow. If, now, the diaphragm is set in vibration by a sound, the passage-way is increased and decreased in size at every vibration, thus increasing and decreasing the resistance to the passage of the current from one cell to the other, owing to the alteration in the size of the liquid conductor. If the amplitude of the diaphragm is very great, the space is nearly, if not altogether, closed at the forward movement, and widened to its fullest extent by the backward motion; and if the amplitude is small, only a slight increase and decrease in size of the aperture take place, according to the size of the opening, so there will be more or less resistance to the current passing through the liquid at this point, and there will be a corresponding rise and fall of electric tension on the line at this point.

It is obvious that with a mobile fluid all the harmonical and other sounds incident to articulation act to produce corresponding changes of electric tension.

The opening that connects one cell with the other is small, and at the side of the electrodes, in preference to being above them; hence the gas formed by decomposition of the fluid from transmitting does not interfere with the operation, nor produce extra sounds, and at the same time a great increase and decrease in the strength of the current are effected by the slightest movement of the diaphragm.

There are many forms of apparatus in which my improvement may be employed.

In Fig. 7 the cylinder B is represented as standing vertically instead of horizontally, as in Fig. 1, which permits of the diaphragms $e$ and $c$ being dispensed with. In Fig. 3 I have represented several narrow slits in the partition $b'$, between the cells, and a thin strip of metal, $i'$, from the diaphragm $i$, running down at the side of the partition, and also slotted; but the slots in the normal position do not correspond; hence, by the vibration of the diaphragm, the openings are increased or lessened, and the resistance to the electric current increased or decreased. A spring, $o$, may be used to hold the plate to the partition.

Fig. 4 shows the partition $b'$ arranged horizontally, the passage-way from one cell to the other being controlled by a valve or plunger, *l*, arranged at an aperture through the partition. In Fig. 5 the passage-way is between two independent cells, by means of a flexible tube, *m*, and the opening is increased or lessened by the movement of the diaphragm acting through a finger, *n*, that presses upon the flexible tube.

I will mention that mercury may be used instead of an electrolyte; or a porous material, such as paper, may serve to connect the cells together, as in Fig. 6.

*s* represents a piece of porous material, such as paper or muslin, and the ends pass into liquid in the cells, so as to be kept moist by capillary attraction, and adjacent to this is a presser, *p*, connected to the diaphragm or other vibrating body, so as to be moved by the same and press with more or less force upon the moistened strip, and interrupt the passage of electricity more or less, according to the amplitude of vibration.

I do not herein claim a mica diaphragm, the same being set forth in my prior application No. 143, filed August 28, 1877. Neither do I herein claim a device for effecting a rise and fall of electric tension by a motion derived from the diaphragm, that having been set forth in my prior application No. 130, filed April 27, 1877, and in my application No. 144, filed September 5, 1877, the electrodes are moved to vary the resistance to the electric current passing through a liquid. In the present instance the electrodes are stationary.

I claim as my invention—

In an acoustic-telegraph apparatus, the combination of two stationary electrodes immersed in two cells, a conducting-fluid in said cells, and a fluid-connection between such cells, and mechanism actuated by a sound-vibrated body, for varying the dimensions of such liquid-connection and the conductivity of the same, substantially as set forth.

Signed by me this 8th day of December, A. D. 1877.

THOS. A. EDISON.

Witnesses:
GEO. T. PINCKNEY,
CHAS. H. SMITH.